Patented Feb. 24, 1931

1,794,300

UNITED STATES PATENT OFFICE

FLOYD C. KELLEY, OF SCHENECTADY, NEW YORK, ASSIGNOR TO GENERAL ELECTRIC COMPANY, A CORPORATION OF NEW YORK

HARD METAL COMPOSITION

No Drawing. Application filed January 7, 1928. Serial No. 245,267.

The present invention relates to the manufacture of metal cutting tools and dies from powdered materials, and more particularly to the manufacture of articles consisting largely of a refractory metal of the sixth group, such as tungsten, to which appreciable amounts of carbon and an element of the iron group, such as cobalt, have been added.

It has heretofore been customary to make such tools and dies either by a process as disclosed in the patent to Schroter No. 1,549,615, or by the processes as disclosed in copending application of S. L. Hoyt, Serial No. 181,536, filed April 6, 1927, or in copending application of E. G. Gilson, Serial No. 187,328, filed April 28, 1927, now Patent No. 1,756,857. In the Schroter process, tungsten carbide is first formed and the carbide and a metal of the iron group are then pressed together and heated to the sintering temperature of the mixture. This process requires a rather extended period of time for its completion, since several hours are necessary in order to form the tungsten carbide. The Hoyt and Gilson processes are carried out by pressing powdered materials, while hot, in a graphite mold. I have found that, in order to produce the best cutting tools and dies from powdered materials, according to the latter processes, it is desirable and important to accurately control the temperature of the materials during the pressing operation and this is a difficult matter when graphite molds are employed since graphite, owing to its nature, seldom heats uniformly. Moreover, when powdered tungsten, carbon and cobalt, for example, are hot pressed in carbon molds, a certain amount of graphite seems to be taken up by the contact surfaces of the material pressed, with the result that the composition of the product varies somewhat from time to time. When the temperature varies, different amounts of cobalt are squeezed out even when the pressure applied is constant. The loss of the cobalt tends to produce a harder but more brittle material and the segregation of cobalt particles on the surface of the pressed material serves to cause soft spots on it after it is copper brazed, for example, to a tool holder or when heated to a high temperature.

While attempts have been made to insulate the carbon mold from the powdered materials and to use metal plungers in the hot press process, this has so far been found to be impractical owing to the tendency of the pressed material to stick to metal plungers at the sintering temperature of the mixture.

According to the present invention, I form a composition consisting of powdered tungsten, carbon and cobalt without preforming tungsten carbide and without employing a carbon mold during any portion of the process. The invention is carried out by pressing the powdered tungsten, carbon and cobalt elements into a desired form and then heating the pressed material to its sintering temperature. When tungsten, carbon and cobalt are cold pressed they will not stick together owing to the presence of the free or uncombined carbon. This difficulty is not present when tungsten carbide is cold pressed with cobalt since such a combination can be readily pressed into shape and will retain its form. In order to hold together the elements of the present mixture during the sintering operation, I add a small percentage of an alkyd resin to the mixture, for example, the resin made by the interaction of glycerine and phthalic anhydride as described in Callahan Patent 1,108,329. This resin is merely a temporary binder and is volatilized during the heating operation. Other organic materials, such as gum tragacanth, may be used as a temporary binder although the results obtained with the latter binder are not as good as those obtained when the alkyd resin is employed.

After the composition has been sintered it may be worked or forged if desired by heating to an elevated temperature, such as 1375° C. and pressing between tungsten or other refractory metal blocks, the metal composition being unconfined in a lateral direction. When treated in this manner, the product obtained is very hard and dense.

In carrying out my invention I add about two per cent of an alkyd resin to a composition consisting of powdered tungsten, carbon and cobalt; the carbon constitutes from 3 to 10% of the composition, the cobalt from about 3 to 25% with the remainder tungsten, as described in the above Gilson application. The powders are milled together until a suitable degree of fineness is obtained and are then moistened with acetone, just enough of the latter being added to dissolve the alkyd resin and to stick the particles of the composition together. The moistened powder is pressed into bars under hydraulic pressure until sufficiently rigid to be easily handled and then placed in closed graphite tubes and fired in a hydrogen furnace in which the temperature can be easily and accurately controlled. The tube and mixture are first fired slowly at a temperature of about 100 to 150° C. in order to cure the resin; that is the slow heating hardens the resin and drives out the gases contained in it without causing any appreciable expansion of the resin. The temperature is then raised slowly to about 350° C. at which temperature the alkyd resin binder is vaporized. Thereafter the temperature of the mixture is raised rapidly to about 1375° C. and held there for a period of about 1½ hours.

The amount of carbon in the composition remains unchanged during the entire heating process. The hydrogen has to go through the carbon tube to reach the mixture and it is my opinion that the hydrogen combines with carbon in the tube to form hydrocarbons which do not have any tendency to change the carbon content of the powdered mixture. Numerous tests have indicated that when tungsten and carbon are heated in a closed carbon tube and in a hydrogen atmosphere that there is substantially no change in the percentage of carbon present in the heated composition.

Cutting tools or dies made according to the above process are hard and tough and take a very good cutting edge. Moreover, the tool may be readily copper brazed to a steel holder and does not become brittle during the brazing operation or when heated to a high temperature. If desired, the tool may be worked or forged by heating it to an elevated temperature and pressing it between blocks of tungsten or other refractory material, the heating being effected by passing an electric current through the tool and tungsten blocks. There is no tendency for the tool to stick to the tungsten blocks such as occurs when powdered material is pressed at this temperature between metal electrodes.

Instead of employing a temporary binder, such as an alkyd resin, I have found that tungsten, carbon and cobalt may be fritted together by heating them in a carbon mold to a temperature of about 850° C. and simultaneously applying pressure thereto. The heating is effected by passing current through the powdered materials. The powders in this case should be insulated from the mold and metallic plungers employed. At the temperature indicated the powdered materials will not stick to the metal electrodes. This temperature is just high enough to cause the powdered particles to adhere. After the powders have been pressed together the material is then heated to a temperature of about 1375° C. for about 1½ hours, as previously indicated, and may thereafter be forged if desired.

While I have illustrated my invention in connection with a combination of tungsten, carbon and cobalt, it is obviously not restricted to these particular elements alone nor to combinations including an element of the sixth group, carbon and an element of the iron group. I have found, for example, that magnet or tool steel, such as disclosed in the patents to Honda Nos. 1,338,132, 1,338,133, 1,338,134 may be formed into a desired shape from powdered materials to which a temporary binder, such as an alkyd resin has been added. The pressed material when heated to its sintering temperature for about one-half hour and then magnetized gives a magnetic density comparable with that of the product disclosed in the patents. Various degrees of alloying may be secured between the mixture of the elements by controlling the time and temperatures of firing. If desired, this material could be forged in the same manner as the tungsten, carbon and cobalt composition indicated above.

What I claim as new and desire to secure by Letters Patent of the United States, is:

1. The method of forming a hard, tough, metallic composition from powdered materials consisting mainly of tungsten but containing at least 3% of cobalt and at least 3% uncombined carbon which comprises binding the materials together temporarily and then heating the materials to their sintering temperature to thereby form a hard, tough, composition consisting substantially of tungsten-carbide and cobalt.

2. The method of forming a metallic composition from a plurality of powdered materials, including at least 3% uncombined carbon, which comprises binding the materials together temporarily, heating the combined materials to their sintering temperature to form a compact mass and thereafter heating the composition to its sintering temperature and simultaneously applying pressure thereto.

3. The method of forming a metallic composition suitable for use as a metal cutting tool from a mixture of a plurality of powdered materials, which comprises adding to the mixture an organic binder element, pressing the mixture together, heating it to a temperature sufficiently high to volatilize the binder, heating to the sintering temperature of the mixture to form a compact mass and thereafter heating the composition to its sintering temperature and simultaneously applying pressure thereto.

4. The method of forming a metallic composition from a powdered mixture consisting largely of tungsten but containing appreciable amounts of carbon and cobalt, which comprises adding to the powdered materials a relatively small percentage of an alkyd resin, moistening the mixture with a solvent, pressing the powdered mixture together, heating it to a temperature high enough to vaporize the solvent and resin, and thereafter heating to the sintering temperature of the mixture.

5. The method of forming a metallic composition from a powdered mixture consisting largely of tungsten but containing appreciable amounts of carbon and cobalt, which comprises adding to the powdered materials a relatively small percentage of an alkyd resin, moistening the mixture with the solvent, pressing the powdered mixture together, heating it to a temperature high enough to vaporize the solvent and resin, heating to the sintering temperature of the mixture to form a compact mass, and thereafter heating the composition to an elevated temperature and pressing it while hot.

6. The method of forming a composition suitable for use as a metal cutting tool which comprises mixing an appreciable amount of powdered carbon and an appreciable amount of an element of the iron group with a powdered element of the sixth group of Mendelejeff's periodic table, adding an alkyd resin thereto, moistening the mixture with a solvent, pressing the mixture together, evaporating the solvent and resin, and heating the remaining mixture to its sintering temperature.

7. The method of forming a composition suitable for use as a metal cutting tool which comprises mixing an appreciable amount of powdered carbon and an appreciable amount of an element of the iron group with a powdered element of the sixth group of Mendelejeff's periodic table, adding an alkyd resin thereto, moistening the mixture with a solvent, pressing the mixture together, evaporating the solvent and resin, heating the mixture to its sintering temperature, and thereafter heating the composition to an elevated temperature and pressing it while hot.

8. The method of forming a metallic composition from powdered materials consisting largely of tungsten but containing appreciable amounts of carbon and metal of the iron group, which comprises mixing the powdered materials, binding them together temporarily, heating the mixture to its sintering temperature and thereafter simultaneously pressing the mixture and heating it at an elevated temperature.

9. The method of forming a metallic composition suitable for use as a metal cutting tool which comprises mixing powdered materials consisting largely of an element of the 6th group of Mendelejeff's periodic table but containing appreciable amounts of carbon and metal of the iron group, binding the powdered materials together temporarily, heating the mixture to its sintering temperature and thereafter simultaneously pressing the mixture and heating it at an elevated temperature.

10. The method of making a metallic composition from mixed powdered materials consisting mainly of tungsten but containing from 3 to 10% free carbon and an appreciable amount but not more than 25% cobalt which comprises binding the powdered materials together temporarily and then heating them to their sintering temperature.

11. The method of forming a metallic composition from mixed powdered materials consisting mainly of tungsten but containing from 3 to 10% carbon and an appreciable amount but not more than 25% cobalt and a few per cent of a binder element which comprises pressing said materials together, heating to a temperature sufficiently high to volatilize the binder and thereafter heating to the sintering temperature of the composition.

12. The method of forming a metallic composition from mixed powdered materials consisting mainly of an element of the 6th group of Mendelejeff's periodic table but containing from 3 to 10% carbon, an appreciable amount but not more than 25% of an element of the iron group and a few per cent of a binder element which comprises pressing the materials together, heating to a temperature sufficiently high to volatilize the binder element, and thereafter heating to the sintering temperature of the composition to form a compact mass.

13. The method of forming a metallic composition from mixed powdered materials consisting mainly of an element of the 6th group of Mendelejeff's periodic table but containing from 3 to 10% carbon, an appreciable amount but not more than 25% of an element of the iron group and a few per cent of a binder element which comprises pressing the materials together, heating to a temperature sufficiently high to volatilize the binder element, then heating to the sintering temperature of the composition to form a compact mass and thereafter heating the composition to an elevated temperature and pressing it while hot.

In witness whereof, I have hereunto set my hand this 6th day of January, 1928.

FLOYD C. KELLEY.